Aug. 4, 1925.
P. R. BACHTEL
1,548,576
INSTANTANEOUS MECHANICAL LEAD SCREW RELEASE MECHANISM
Filed May 13, 1922   3 Sheets-Sheet 1
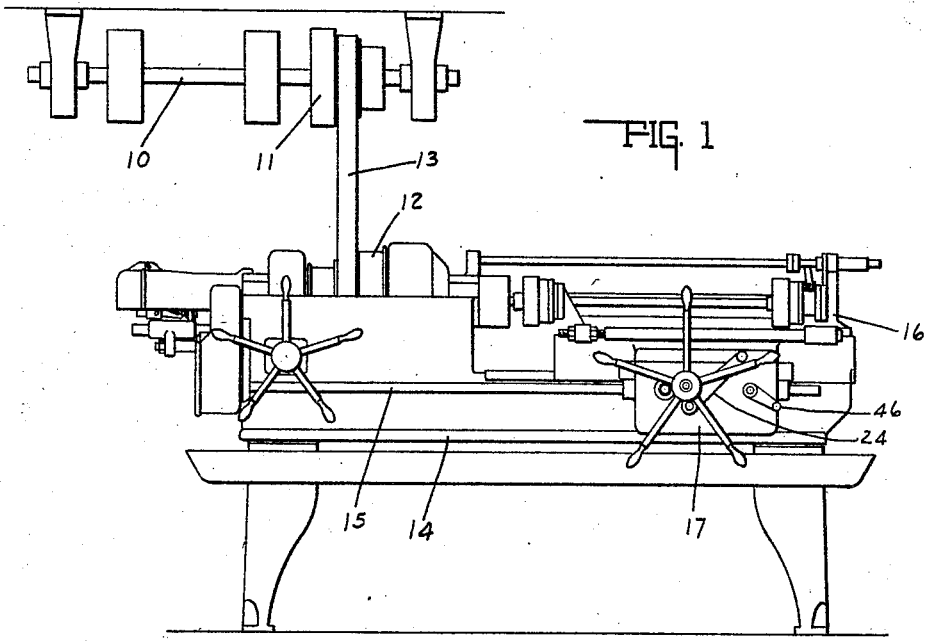
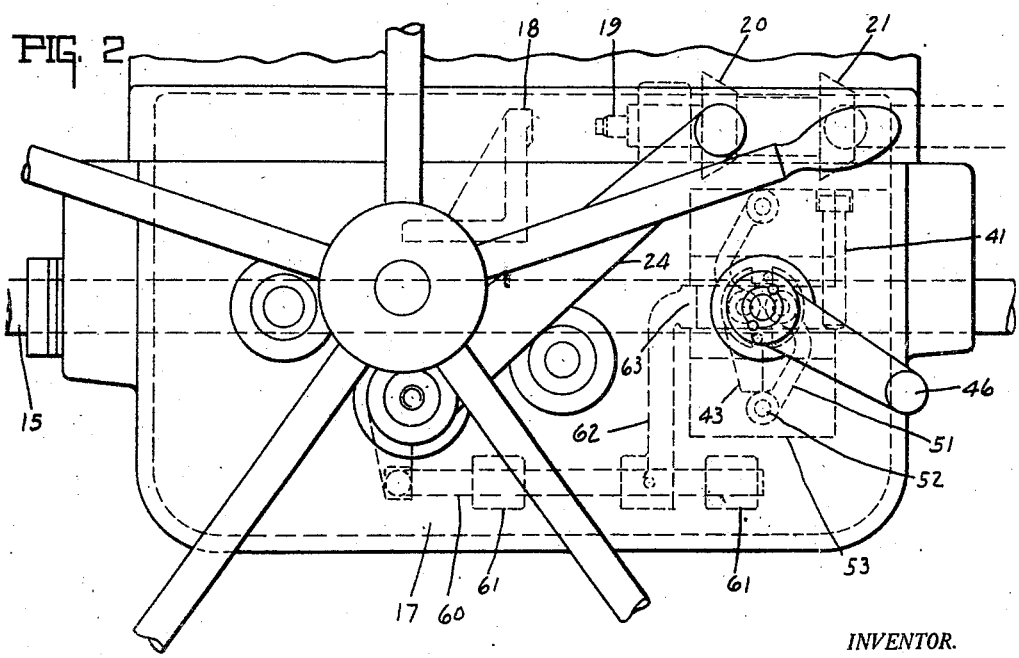
INVENTOR.
PAUL R. BACHTEL.
BY
Lockwood & Lockwood
ATTORNEYS.

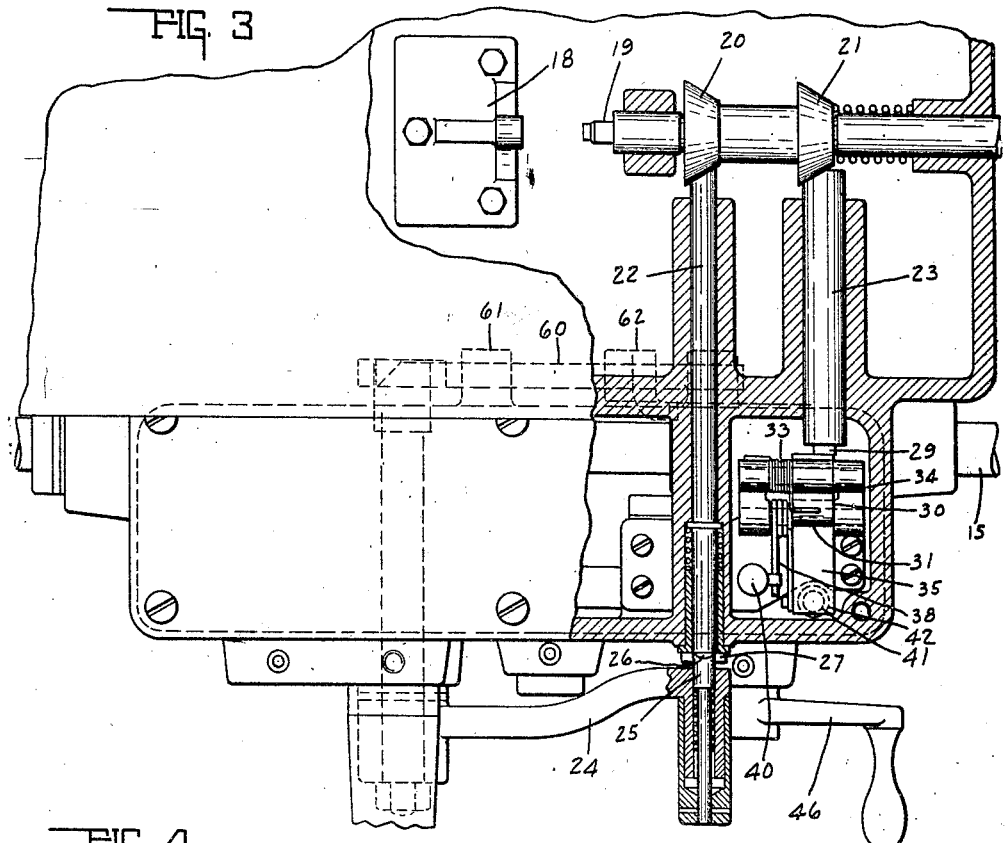
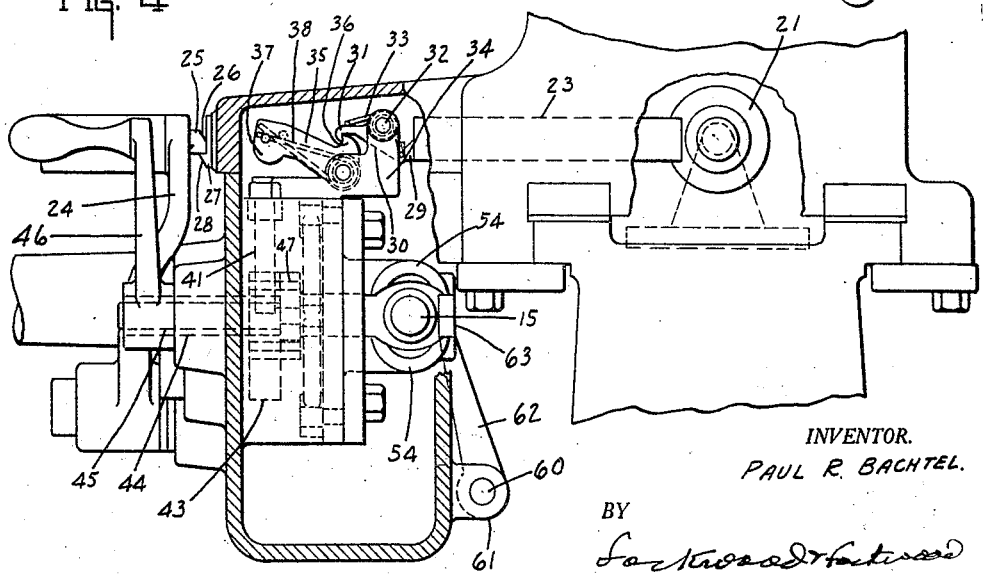

Aug. 4, 1925.
P. R. BACHTEL
1,548,576
INSTANTANEOUS MECHANICAL LEAD SCREW RELEASE MECHANISM
Filed May 13, 1922  3 Sheets-Sheet 3
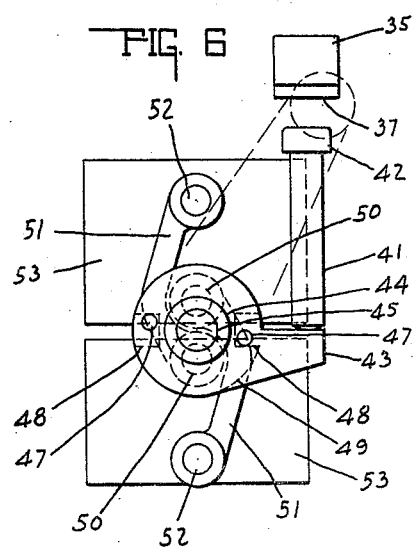
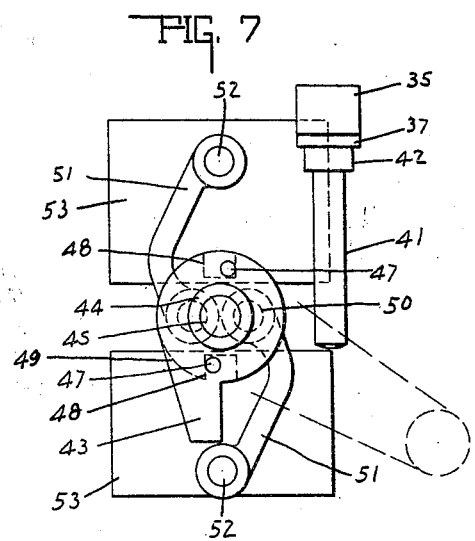
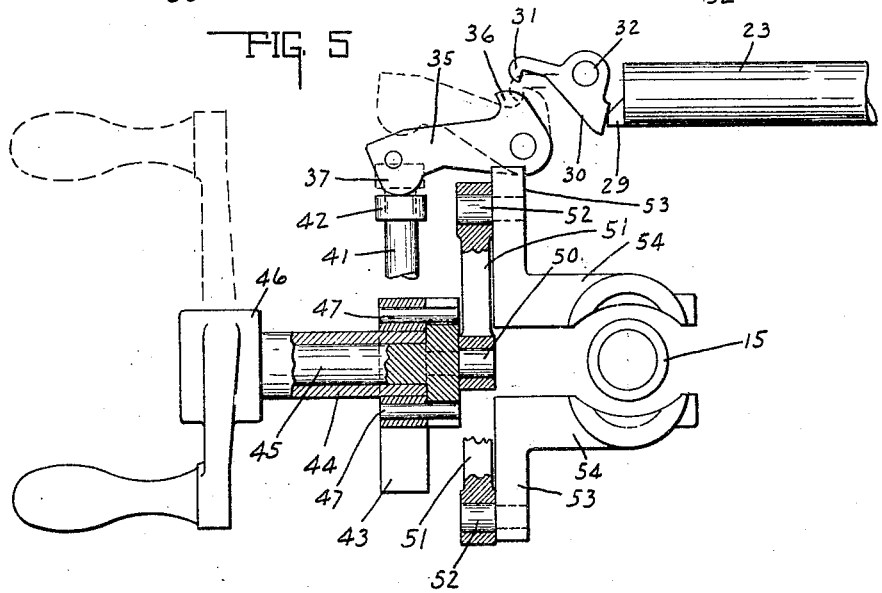
INVENTOR.
PAUL R. BACHTEL.
BY
*Lockwood & Lockwood*
ATTORNEYS.

Patented Aug. 4, 1925.

1,548,576

UNITED STATES PATENT OFFICE.

PAUL R. BACHTEL, OF INDIANAPOLIS, INDIANA, ASSIGNOR, BY MESNE ASSIGNMENTS, TO GISHOLT MACHINE COMPANY, OF MADISON, WISCONSIN, A CORPORATION.

INSTANTANEOUS MECHANICAL LEAD-SCREW-RELEASE MECHANISM.

Application filed May 13, 1922. Serial No. 560,620.

*To all whom it may concern:*

Be it known that I, PAUL R. BACHTEL, a citizen of the United States, and a resident of Indianapolis, county of Marion, and State of Indiana, have invented a certain new and useful Instantaneous Mechanical Lead-Screw-Release Mechanism; and I do hereby declare that the following is a full, clear, and exact description thereof, reference being had to the accompanying drawings, in which like numerals refer to like parts.

This invention relates to a power operable machine having a lead screw and means operable by the lead screw.

The chief object of the invention is to provide a novel connection between the means operable by the lead screw and the lead screw which connection is operable in the operation of the lead screw operable means, and in addition thereto is instantaneously operable for releasing the lead screw operable means from the lead screw.

Another object of the invention is to provide the connecting means with manually operable means for disassociating the same when desired.

The chief features of the invention consist in the means whereby the aforesaid objects are accomplished, and in addition thereto the provision of means whereby an interlocking arrangement is secured between the lead screw operable means and other means associated with the power operable machine.

The full nature of the invention will be understood from the accompanying drawings and the following description and claims.

In the drawings, Fig. 1 is a side elevational view of a power operable machine such as a lathe which is provided with the invention. Fig. 2 is an enlarged side elevational view of the apron construction and associated mechanism carried thereby with the invention shown dotted. Fig. 3 is an enlarged top plan view of the invention and associated mechanism for operating the same with parts broken away to show other parts in detail. Fig. 4 is a transverse sectional view showing the parts illustrated in Fig. 3. Fig. 5 is an enlarged side elevational view showing the several parts shown in Fig. 4 in the released position, the dotted lines indicating the set position. Fig. 6 is an elevational view of some of the parts showing the same in the lead screw engaging position. Fig. 7 is a similar view of the same parts showing the latter in the non-engaging position.

In the drawings 10 indicates a power shaft carrying the pulley 11 which is adapted to drive the pulley 12 by a belt 13. The pulley 12 is a part of a lathe having a supporting bed 14 and a lead screw 15 operable through a power connection by the shaft 10. The lathe also is provided with a slide or carriage 16 associated with which is an apron 17. The apron 17 is movable longitudinally of the lathe and by the lead screw 15. The bed 14 of the lathe carries a stop member 18 and the carriage 16 is provided with a yieldingly and adjustably supported plunger 19 carrying the cams 20 and 21, see Figs. 3 and 4. The cam 20 is adapted to engage a transversely positioned plunger 22; while the cam 21 is adapted to engage a similarly and parallel positioned plunger 23. A handle 24 is provided with a yieldingly supported pin 25 having a beveled surface 26. The plunger 22 is also yieldingly supported and is movable by the cam 20 out of line with a ledge 27 formed adjacent to the plunger 22 and having a beveled surface 28. Thus in counterclockwise rotation of the handle 24, the beveled surfaces 26 and 28 are engaged and the pin 25 is depressed in the handle until said pin passes the ledge portion 27, whereupon the pin is projected upon the ledge and retains the handle 24 in elevated position until such time as the plunger 22 is actuated by the cam 20 to release the pin 25 from ledge 27. The plunger 23 operable by the cam 21 is provided with an abutment 29 for engaging one end of a pivotally supported or bell crank type of catch 30 having a catch portion 31. The catch 30 is pivotally supported at 32 and a spring 33 has one end which bears upon said catch to retain the same in the latching position and the other end bears against the base 34. The plunger thus acts against the spring 33 to tilt the catch upon its pivot. Also pivotally supported upon the base 34 is a hammer member having a tooth 36 and a head 37. The tooth 36 is engageable by the catch 31 which retains said head in the elevated position. A spring 38 is secured at one end to the head and the other end is stationarily secured at 40. The hammer thus normally tends to position itself as shown by the full lines in Fig. 5, unless restrained by the catch 31 engaging the tooth 36 of said hammer, see the dotted lines in Fig. 5, and said catch is releasable by the plunger 23 as hereinbefore described. Positioned beneath the hammer head 37 is a bolt or plunger 41 having a head 42 engageable by the head 37. The bolt 41 is slidably supported, and associated therewith is an arm 43 see Figs. 6 and 7. The arm 43 is rigid with a tube or sleeve 44, and upon a shaft 45 within said tube and also secured thereto is a handle 46. The arm 43 carries a pair of oppositely positioned pins 47 which are positioned parallel to the tube 44 and are seatable in a pair of slots 48 in a disk plate 49. The plate 49 also supports the pivots 50. Connected with each pivot 50 is a link 51 which is pivotally supported at 52 upon a base member 53 provided with a projecting portion 54 formed in the shape of a partial or half nut for engaging the lead screw 15.

From the foregoing it will be understood that when the handle 46 is moved from the position shown in Figs. 5 and 7 into the position shown dotted in Fig. 5, the arm 43 engages the plunger 41. Continued plunger movement tilts the hammer 35 until the tooth 36 is engaged by the catch 31 of the latch 30. Return of the handle thereupon permits the plunger 41 to drop back to the normal position by reason of the slots 48 provided in the disk 49. Simultaneously with the movement of the hammer 35 into the cocked position the plate 49 is moved from the position shown in Fig. 7, wherein the half nuts are in disengaged or open position, into the position shown in Fig. 6, wherein the half nuts are shown in the closed or lead-screw engaging position. If it is desired to manually disengage the half nuts from the lead screw, the handle 46 may be returned to the position shown by the dotted lines in Fig. 5 and the hammer will still remain in the cocked position.

The operation is as follows: When the carriage has moved the cam 21 into engagement with the plunger 23, said plunger tilts the catch 30 and releases the tooth 36 from the latch 31. The hammer 35, immediately and instantaneously under the influence of the spring 38, engages the plunger 41, which in turn strikes the arm 43 to oscillate the pivots 50 of the toggle links 51. This oscillatory movement also is communicated to the plates 53 of the half nuts 54. Thus the half nuts 54 are disengaged from the lead screw 15 instantaneously through the medium of a trip hammer construction.

As shown clearly in Fig. 3, there is associated with the handle 24 a sliding rod 60 slidably supported in the bracket 61. The sliding rod 60 carries an arm 62 which terminates in a spacing block 63, and as shown clearly in Fig. 4 said spacing block is movable between the half nuts 54 to maintain the same separated when the handle 24 is actuated. Thus there is an interlocking construction provided whereby the half nuts are not permitted to engage the lead screw unless the handle 24 is in the desired or non-locking position.

The invention claimed is:

1. In a machine, the combination with a rotatable lead screw, a support movable longitudinally thereof, and a partial nut supported by and movable with said support and adapted to engage said lead screw and partially encircle the same, of a trip hammer, a catch for said hammer normally retaining the hammer in non-tripped position and automatically operable in the movement of the support to release the hammer from the catch, and means operable by the hammer and engageable thereby for instantaneously disconnecting the partial nut from the lead screw when said catch is released.

2. A device of the character described in claim 1, characterized by the addition of manually operable means for resetting the hammer.

3. A device of the character described in claim 1, characterized by manually operable means for preventing lead screw engagement by said partial nut.

4. In a machine, the combination with a rotatable lead screw, a support movable longitudinally thereof, and a partial nut supported by and movable with said support and adapted to engage said lead screw and partially encircle the same, of a trip hammer, a catch for said hammer normally retaining the hammer in non-tripped position and normally operable in the movement of the support to release the hammer from the catch, means operable by the hammer and engageable thereby for instantaneously disconnecting the partial nut from the lead screw when said catch is released, manually operable means for resetting the hammer, and manually operable means for preventing lead screw engagement by said partial nut.

5. A device of the character described in claim 1, characterized by manually operable means for disengaging the partial nut from the lead screw.

6. A device of the character described in claim 1, characterized by the addition of manually operable means for simultaneously disengaging the partial nut from the lead screw and for resetting the trip hammer.

7. In a machine, the combination with a rotatable lead screw, a support movable longitudinally thereof, and a plurality of partial nuts each supported by and movable with said support and adapted to engage said lead screw and partially encircle the same, of a trip hammer, a catch for said hammer normally retaining the hammer in non-trip position and automatically operable in the movement of the support to release the hammer from the catch, and link means connected to each of the partial nuts and simultaneously operable by the hammer and engageable thereby for instantaneously disconnecting the partial nuts from the lead screw when said catch is released.

In witness whereof, I have hereunto affixed my signature.

PAUL R. BACHTEL.